United States Patent
Domanski et al.

(10) Patent No.: US 9,992,514 B2
(45) Date of Patent: Jun. 5, 2018

(54) SYSTEM AND A METHOD FOR DISOCLUDED REGION CODING IN A MULTIVIEW VIDEO DATA STREAM

(71) Applicant: Politechnika Poznanska, Poznan (PL)

(72) Inventors: Marek Domanski, Poznan (PL); Tomasz Grajek, Poznan (PL); Damian Karwowski, Poznan (PL); Krzysztof Klimaszewski, Murowana Goslina (PL); Olgierd Stankiewicz, Poznan (PL); Jakub Stankowski, Poznan (PL); Krzysztof Wegner, Murowana Goslina (PL)

(73) Assignee: POLITECHNIKA POZNANSKA, Poznan (PL)

(*) Notice: Subject to any disclaimer, the term of this patent is extended or adjusted under 35 U.S.C. 154(b) by 0 days. days.

(21) Appl. No.: 14/753,010

(22) Filed: Jun. 29, 2015

(65) Prior Publication Data
US 2016/0381390 A1 Dec. 29, 2016

(30) Foreign Application Priority Data

Jun. 25, 2015 (PL) .......................................... 412844

(51) Int. Cl.
*H04N 7/12* (2006.01)
*H04N 19/597* (2014.01)
(Continued)

(52) U.S. Cl.
CPC ......... *H04N 19/597* (2014.11); *H04N 19/119* (2014.11); *H04N 19/13* (2014.11);
(Continued)

(58) Field of Classification Search
CPC .................................................... H04N 19/597
(Continued)

(56) References Cited

U.S. PATENT DOCUMENTS

| 2014/0241582 | A1* | 8/2014 | Gaddy | G06K 9/00624 382/103 |
| 2016/0065990 | A1* | 3/2016 | Shimizu | H04N 19/597 375/240.12 |

* cited by examiner

*Primary Examiner* — Richard Torrente
(74) *Attorney, Agent, or Firm* — Mark M. Friedman

(57) ABSTRACT

A method for disoccluded region coding in multiview video data stream by an entropy encoder, the method comprising the steps of: coding a block of a base view; storing state and estimated probabilities in contexts models of the entropy encoder in a context storage module with a reference identifying the block of the base view; repeating the aforementioned steps of coding and storing for every block of the base view of the multiview video data stream; starting coding of a disoccluded region and dividing, into blocks, disoccluded area of a side view associated with the base view; determining, for neighboring blocks, of currently coded block, that have not been in the disoccluded area, a corresponding block in the base view, using a block correspondence database; when such a correspondence is determined, reading a previously stored state and estimated probabilities in context models of the entropy encoder for the corresponding block; copying all coding modes from the corresponding block to the neighboring block; applying state and estimated probabilities in context models to the entropy encoder of the block that is adjacent to the currently processed block; encoding, by the entropy encoder, the selected block of the side view; and repeating steps (e) to (i) for all blocks of the side view associated with the base view processed in steps (a) to (b).

5 Claims, 4 Drawing Sheets

Side view    Base view

(51) Int. Cl.
    *H04N 19/13*     (2014.01)
    *H04N 19/91*     (2014.01)
    *H04N 19/119*     (2014.01)
    *H04N 19/139*     (2014.01)
    *H04N 19/176*     (2014.01)
    *H04N 19/52*     (2014.01)
    *H04N 19/96*     (2014.01)

(52) U.S. Cl.
    CPC ......... *H04N 19/139* (2014.11); *H04N 19/176* (2014.11); *H04N 19/52* (2014.11); *H04N 19/91* (2014.11); *H04N 19/96* (2014.11)

(58) Field of Classification Search
    USPC ..................................................... 375/240.02
    See application file for complete search history.

Side view

Base view

SYSTEM AND A METHOD FOR DISOCLUDED REGION CODING IN A MULTIVIEW VIDEO DATA STREAM

TECHNICAL FIELD

The present disclosure relates to a system and a method for disoccluded region coding in multiview video data stream. In particular, the present disclosure relates to mitigating context dilution during disoccluded region coding.

BACKGROUND

In video encoding methods, it is known to use one of two entropy coding methods in a block-wise prediction coding architecture. One is called context-adaptive binary arithmetic coding (CABAC) and the other one is called context-adaptive variable length coding (CAVLC).

Context modeling provides estimates of conditional probabilities of coding symbols. By utilizing suitable context models, a given inter-symbol redundancy can be exploited by switching between different probability models according to already-coded symbols in the neighborhood of the current symbol to be encoded. Context modeling is responsible for most of CABAC's roughly 10% savings in bit rate over the CAVLC entropy coding method (source: Wikipedia).

Therefore, modern video data coding methods base their efficiency on context-adaptive coding.

In this technical area, there is also known a term of context dilution. As explained in the publication "TOWARDS OPTIMISED CONTEXT SELECTION IN SCALABLE WAVELET BASED VIDEO CODING" (by Toni Zgaljic, Marta Mrak and Ebroul Izquierdo, 15th European Signal Processing Conference (EUSIPCO 2007), Poznan, Poland, Sep. 3-7, 2007), although application of context modeling can significantly improve compression, using too many context models or having too few symbols to be encoded, can result with context dilution, meaning that probability estimations within context model are inefficient since the number of symbols used in each context model is too low to obtain a good probability estimate. In such case data outputted by arithmetic encoder will be expanded. On the other hand, if too few context models are used redundancies between symbols are not efficiently exploited resulting in less efficient compression. Thus, context models have to be carefully selected.

In multiview video coding, context dilution is present with respect to Disoccluded Region Coding (DRC). In DRC there is coded a base view as well as parts of other views (frequently referred to as side views), which became visible due to perspective change with respect to the base view, called disoccluded areas of side views. The disoccluded area in a side view is divided into blocks and coded. Finally, only blocks in the disoccluded areas, are transmitted in an output data stream.

A U.S. Pat. No. 7,817,865 discloses multi-view video data that includes video data of a base view and an ancillary view, the base view indicating a view being decoded independently of other views without using inter-view prediction, the ancillary view being a view other than the base view. If several view sequences to be encoded are given, a center location of the overall arrangement is set to a base view, such that view sequences to be encoded can be hierarchically selected. Images of the reference-view are independently encoded without referring to an image of another view.

Therefore, there is a need to mitigate context dilution during disoccluded region coding, in order to improve compression ratios for side views in multiview coding.

SUMMARY

There is disclosed herein a method for disoccluded region coding in multiview video data stream by an entropy encoder, the method comprising the steps of:
(a) coding a block of a base view;
(b) storing state and estimated probabilities in contexts models of the entropy encoder in a context storage module with a reference identifying the block of the base view;
(c) repeating the aforementioned steps of coding and storing for every block of the base view of the multiview video data stream;
(d) starting coding of a disoccluded region and dividing, into blocks, disoccluded area of a side view associated with the base view;
(e) determining, for neighboring blocks, of currently coded block, that have not been in the disoccluded area, a corresponding block in the base view, using a block correspondence database;
(f) when such a correspondence is determined, reading a previously stored state and estimated probabilities in context models of the entropy encoder for the corresponding block;
(g) copying all coding modes from the corresponding block to the neighboring block;
(h) applying state and estimated probabilities in context models to the entropy encoder of the block that is adjacent to the currently processed block;
(i) encoding, by the entropy encoder, the selected block of the side view;
(j) repeating steps (e) to (i) for all blocks of the side view associated with the base view processed in steps (a) to (b).

The block can be the smallest coding unit.

The block can be a group of points encoded together, with a use of one selected mode, data of which are entropy coded.

The context of the entropy encoder can be its configuration obtained by means of analysis of preceding and current image data during an encoding process.

The context may include coding modes, that are decision points outputs, selected during encoding process, at which the encoder may select one of possible modes.

To determine a block corresponding to a given block X, the following steps can be performed: enumerating, for currently coded block, all its neighboring blocks Yi; checking, for the neighboring blocks Yi, whether a given Yi block belongs to a disoccluded area; in case a given Yi block does not belong to the disoccluded area, finding a block Yi', in the base view, corresponding to the Yi block; copying encoder's state, estimated probabilities in context models, coding modes and syntax elements from Yi' block to block Yi; and selecting block Yi being a left side neighbor of the block X.

There is also disclosed a computing device program product for disoccluded region coding in multiview video data stream, the computing device program product comprising: a non-transitory computer readable medium; programmatic instructions (a) for coding a block of a base view; programmatic instructions (b) for storing state and estimated probabilities in contexts models of the entropy encoder in a context storage module with a reference identifying the block of the base view; programmatic instructions (c) for repeating the aforementioned steps of coding and storing for every block of the base view of the multiview video data stream; programmatic instructions (d) for starting coding of a disoccluded region and dividing, into blocks, disoccluded area of a side view associated with the base view; programmatic instructions (e) for determining, for neighboring blocks, of currently coded block, that have not been in the disoccluded area, a corresponding block in the base view, using a block correspondence database; programmatic instructions (f) for when such a correspondence is determined, reading a previously stored state and estimated probabilities in context models of the entropy encoder for the corresponding block; programmatic instructions (g) for copying all coding modes from the corresponding block to the neighboring block; programmatic instructions (h) for applying state and estimated probabilities in context models to the entropy encoder of the block that is adjacent to the currently processed block; programmatic instructions (i) encoding, by the entropy encoder, the selected block of the side view; and programmatic instructions (j) for repeating programmatic instructions (e) to (i) for all blocks of the side view associated with the base view processed in programmatic instructions (a) to (b).

There is also disclosed a system for disoccluded region coding in multiview video data stream by an entropy encoder, the system comprising: a data bus communicatively coupling components of the system; a memory for storing data; an encoder for encoding the multiview video data stream; a context storage module configured to store context, of the entropy encoder, with a reference identifying the block of the base view; a block correspondence database configured to store a correspondence between an identified disoccluded block of a side view and a block of a base view; a controller configured to perform the following steps:
  a) coding a block of a base view;
  b) storing state and estimated probabilities in contexts models of the entropy encoder in a context storage module with a reference identifying the block of the base view;
  c) repeating the aforementioned steps of coding and storing for every block of the base view of the multiview video data stream;
  d) starting coding of a disoccluded region and dividing, into blocks, disoccluded area of a side view associated with the base view;
  e) determining, for neighboring blocks, of currently coded block, that have not been in the disoccluded area, a corresponding block in the base view, using a block correspondence database;
  f) when such a correspondence is determined, reading a previously stored state and estimated probabilities in context models of the entropy encoder for the corresponding block;
  g) copying all coding modes from the corresponding block to the neighboring block;
  h) applying state and estimated probabilities in context models to the entropy encoder of the block that is adjacent to the currently processed block;
  i) encoding, by the entropy encoder, the selected block of the side view; and
  j) repeating steps (e) to (i) for all blocks of the side view associated with the base view processed in steps (a) to (b).

BRIEF DESCRIPTION OF FIGURES

These and other objects presented herein, are accomplished by providing a system and method for disoccluded region coding in multiview video data stream. Further details and features of the present disclosure, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DETAILED DESCRIPTION

State of the art video encoders may lead to context dilution during disoccluded region coding in multiview sequences. This is due to the fact, that during encoding with hybrid compression techniques such as AVC (Advanced Video Coding) or HEVC (High Efficiency Video Coding), an entropic coder is reset before each view (image). This in turn causes context dilution, i.e. the coder has insufficient amount of data in order to properly estimate probabilities of different symbols in each context model, when encoding blocks of disoccluded areas in side views (due to a low number of blocks to encode).

The method and system presented herein use the state and context models of the entropy encoder copied from the base view.

Figure 1:
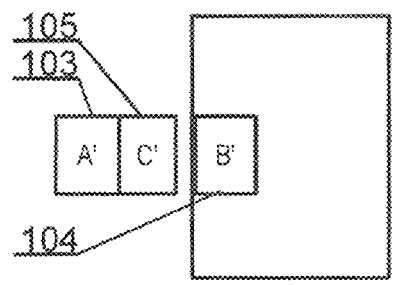
FIG. 1 shows an example of a base view and a side view.
Figure 1:
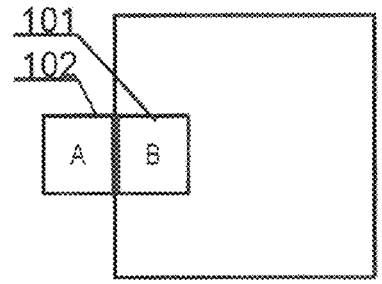
Figure 1:
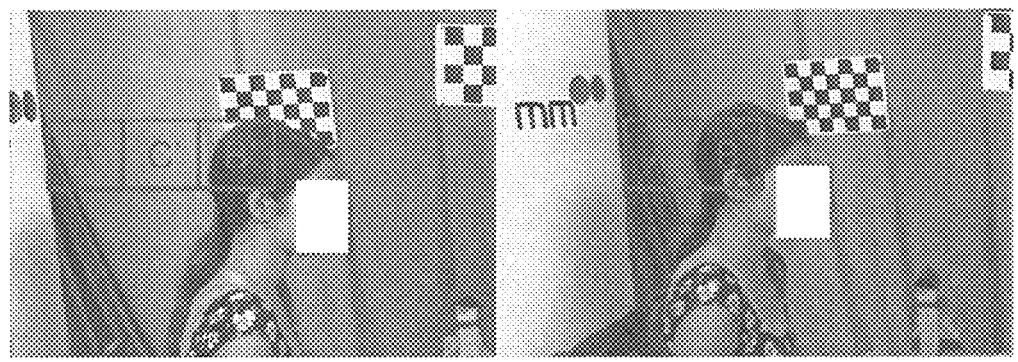

FIG. 1 presents an example of a base view and a side view. The base view comprises two blocks A (102) and B (103), such that block A represents a section of a background and block B represents a section of an object in the fore plan. Due to perspective change, a side view comprises, in addition to blocks A' (103, representing the same section of the scene as block A) and B' (104, representing the same section of the scene as block B), a section of a disoccluded background denoted as C' (105).

In DRC coding, block A' of the side view is a block of a section that is not encoded and not transmitted (it is not present in the disoccluded area, because the section of the scene representing block A' has already been encoded as block A in the base view).

In the method and system presented herein, during encoding of block C', the entropy encoder uses the state and estimated probability of the symbols in the contexts models of the entropy encoder, present at a time when the encoder has finished coding block A of the base view corresponding to block A. Block A is selected as the previously processed block with respect to block C'.

Then subsequent blocks of given row of disoccluded area are using state and estimated probability in context models of the previously encoded block (B' used C' state and contexts).

The block A is selected based on analysis of depth map of the base view. For example, the block A can be the block that comprises the highest number of fragments of the image that will be projected by the DIBR to the A' block.

A block is preferably the smallest coding unit (eg a block in AVC or TU/PU in HEVC), however in other embodiments it may be a group of points encoded together with a use of one selected mode, data of which are entropy coded.

A block may be the block according to the block size corresponding to a given block in base view.

Figure 2:
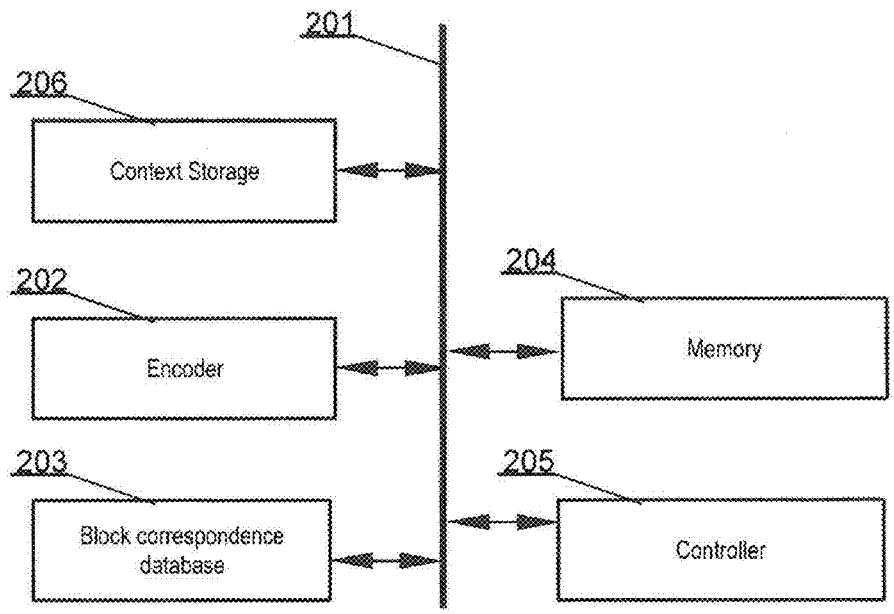
FIG. 2 shows a diagram of the system for disoccluded region coding.
Figure 3:
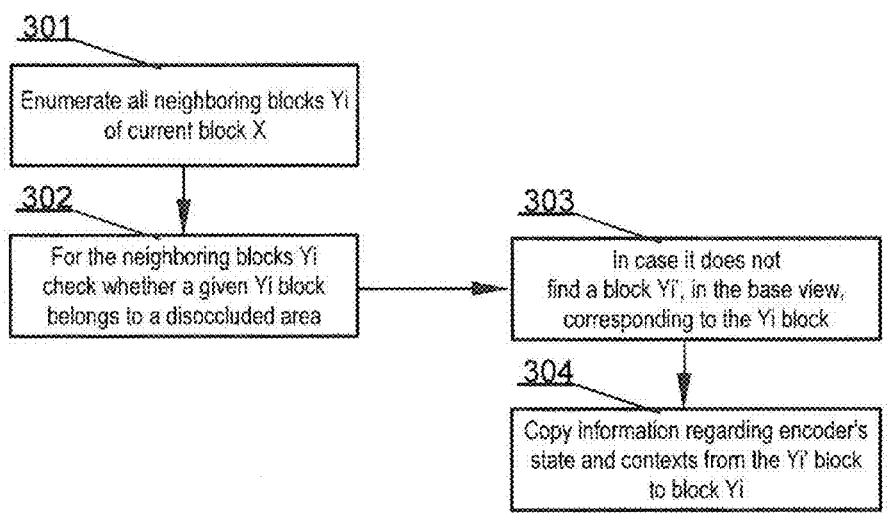
FIG. 3 presents a method for finding blocks corresponding to neighbors of a given block X.

FIG. 2 presents a diagram of the system for disoccluded region coding. The system may be realized using dedicated components or custom made FPGA or ASIC circuits. The system comprises a data bus (201) communicatively coupled to a memory (204). Additionally, other components of the system are communicatively coupled to the system bus (201) so that they may be managed by a controller (205).

The memory (204) may store computer program or programs executed by the controller (205) in order to execute steps of the method for disoccluded region coding.

The system comprises an encoder (202) such as AVC or HEVC encoder. Whenever the encoder (202) finishes the encoding of a block of image data, its state and estimated probabilities from context models are stored in a context storage module (206).

The state and estimated probabilities in context models of the encoder are its configuration obtained by means of analysis of preceding and current image data during an encoding process.

Coding Tree Unit (CTU) is the basic processing unit of the HEVC video standard and conceptually corresponds in structure to macroblock units that were used in several previous video compression standards.

Most of generic implementations of encoders (e.g. reference software of MPEG-AVC or HEVC) comprise a "trace" output providing a log of coding modes that have been applied by the encoders during processing of input data.

However in a typical, commercial implementation, the trace output is typically not available for reading coding modes. In order for such output to be available, it would be necessary to modify such a typical, commercial encoder implementation.

The aforementioned state and contexts of the encoder (202) are stored together with an appropriate reference to the data block intended for encoding. Thus, the context storage module (206) stores for example the state and contexts of the encoder (202) present after encoding block A of the base view of the image shown in FIG. 1. Thus, as more blocks are coded for the base view, the context storage module (206) becomes a database of states and contexts of the encoder (202) for the current base view. Optionally, the context storage module (206) is reset when starting to encode a new base view frame.

Additionally, the system comprises a block correspondence database (203). This module is configured to provide a correspondence between an block of a side view (such as A') and a block of a base view (such as A). This helps during side view encoding as the encoder may be quickly set up using the state and estimated probability of the symbols in context models associated with the identified block of a given base view.

Figure 5A:
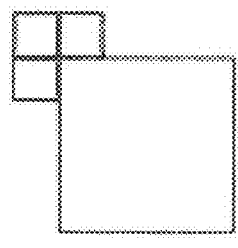
FIG. 5A, 5B show neighboring blocks for currently coded block for AVC coding and HEVC coding, respectively.
Figure 5B:
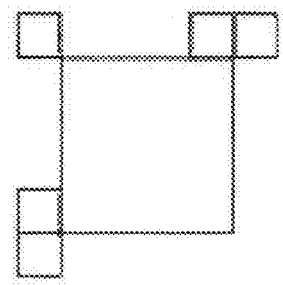

During encoding of the e.g. block X in the side view, the system firstly finds all its neighbors, for example by performing the following steps. At step (301) for currently coded block of a side view, there are enumerated all its neighboring blocks Yi (both in time and space), as shown in FIG. 5A (for AVC) and FIG. 5B (for HEVC).

Subsequently, at step (302), for the neighboring blocks Yi there is checked whether a given Yi block belongs to a disoccluded area. In case it does not (303), there is found, in the correspondence database (203), a block Yi', in the base view, corresponding to the Yi block.

Next, at step (304) there is copied information about coding modes from Yi' block to block Yi.

The coding modes are herein understood as decision points outputs selected during encoding process, at which an encoder may select one of possible modes (for example allowed by a coding standard). For example, in case of AVC coding the modes may include: macroblock type (I/P/B), prediction type, motion vector. In case of HEVC coding, the modes may include: applied partitioning of picture into Coding Tree Units (CTUs), partitioning into Prediction Units (PUs) and Transform Units (TUs), prediction type in each PU, motion vector.

Apart from the aforementioned, the applied coding modes are always signaled in the encoded output data stream, which is a primary output of an encoder. Thus, coding modes may be extracted, depending on an encoder, either prior to or after coding a given data block by an encoder.

Before encoding of the X block, the entropy encoder is initiated with a state and probabilities estimated in each context model, associated with Yi block being a left side neighbor of block X (that should have been processed earlier). Alternatively, the state of the encoder is copied. Context models are initialized with estimated probability in correspondence with context models that were present after encoding block that is the left side neighbor of the block X. The left neighbor is selected due to the coding order: a raster scan order for AVC and a z-order for HEVC coders. In case another coding method is used, that utilizes another coding order, a neighbor from a different side can be selected, depending on the coding order.

Figure 4:
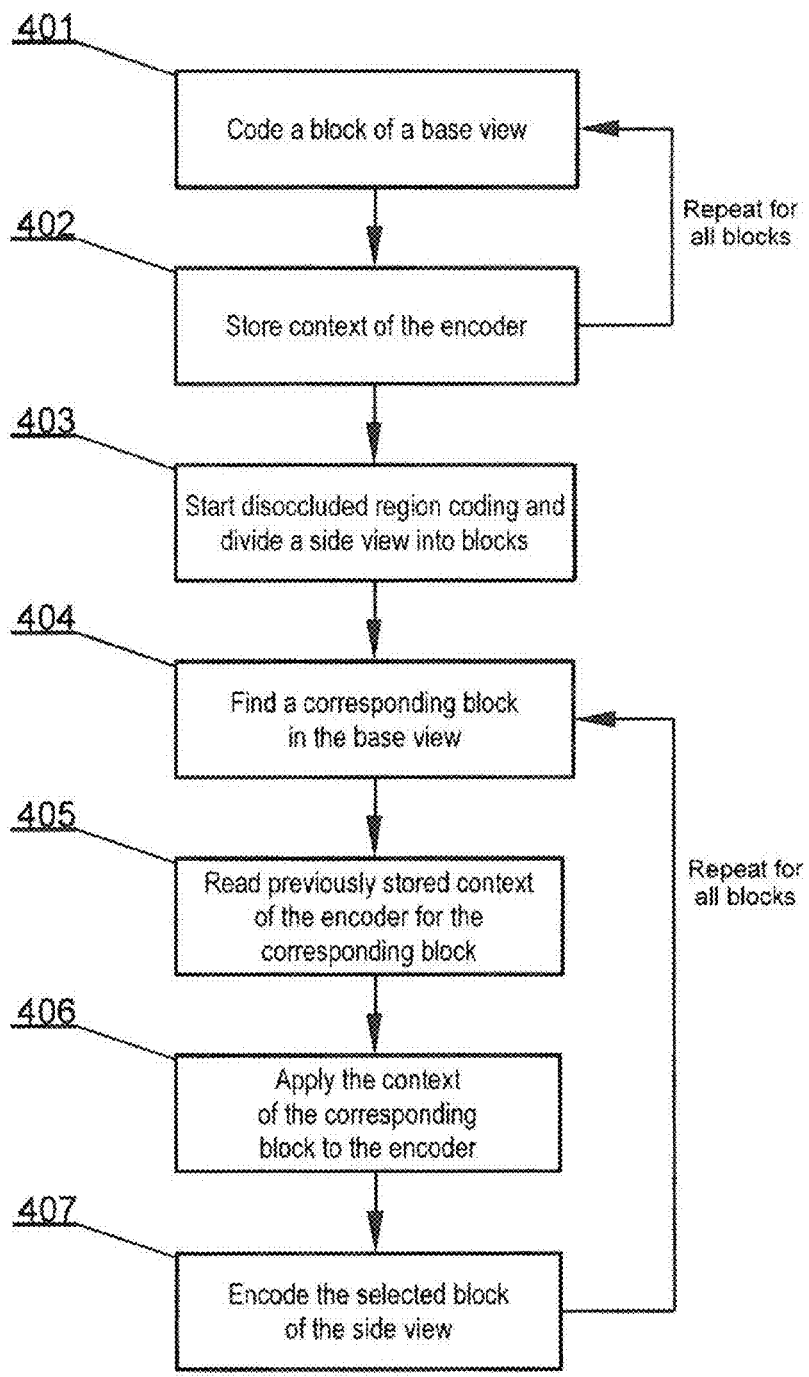
FIG. 4 shows a diagram of the method for disoccluded region coding.

FIG. 4 presents a diagram of the method for disoccluded region coding. The method starts at step (401) by coding a block of a base view. Subsequently, at step (402), state and estimated probabilities in all context models of the encoder are stored at the context storage (206). Depending on the encoder type, this step may be executed before step (401) when the encoding process is set up for the next data block. Steps (401) and (402) are repeated for every block of the base view of a multiview data.

Subsequently, at step (403), coding of the disoccluded region is started and disoccluded area of a side view is divided into blocks. There may be a number of side views associated with a base view of a multiview arrangement.

Next, at step (404), for neighboring blocks of currently coded block that have not been in the disoccluded area, corresponding blocks in the base view are determined, using the block correspondence database (203) and one such corresponding block (for each of the neighboring blocks) is selected. When such a correspondence is determined, a previously stored state and estimated probabilities in context models the encoder are read in step (405) from the corresponding block and stored in the neighboring block. Additional coding modes of the corresponding block are being copied to the neighboring block.

Subsequently, the block that is on the left of the currently processed block is selected and state and estimated probability stored in this block are applied (406) as the state and estimated probabilities in context models used to encode currently processed block (in the encoder 202).

Next, the encoder selects one of the context models based on coding modes in the neighbor blocks of the currently processed block and picks estimated probability in that selected context model and encodes (407) the selected block of the side view. The steps (404) to (407) are repeated for all blocks of the side views) associated with the base view processed in steps (401-402).

The method and system presented herein result in increased compression with respect to side views in multiview coding. Therefore, the method provides a useful, concrete and tangible result.

According to the aforementioned detailed embodiments of the presented method and system, data are processed in order to improve compression ratio. This is effected in a particularly defined machine. Therefore, the machine or transformation test is fulfilled and that the idea is not abstract.

It can be easily recognized, by one skilled in the art, that the aforementioned method for disoccluded region coding in multiview video data stream, may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for disoccluded region coding in multiview video data stream by an entropy encoder, the method comprising the steps of:
   a) entropy encoding a block of a base view;
   b) storing a state and estimated probabilities in contexts models of the entropy encoder in a context storage module with a reference identifying the block of the base view;
   c) repeating the aforementioned steps of encoding and storing for every block of the base view of the multiview video data stream;
   d) starting encoding of a detected disoccluded region and dividing, into blocks, disoccluded region of a side view associated with the base view;
   e) determining, for neighboring blocks, of a currently encoded block of the disocluded region, that are not in the disoccluded region, a corresponding block in the base view, using a block correspondence database;
   f) when such a correspondence is determined, reading a previously stored state and estimated probabilities in context models of the entropy encoder for the corresponding block;
   g) copying all coding modes from the corresponding block in the base view, to the neighboring block according to said correspondence;
   h) applying, to the entropy encoder, the state, including said coding modes, and the estimated probabilities in the context models of the block, including the disoccluded region, that is on the left of the currently encoded block;
   i) encoding, by the entropy encoder, the currently encoded block of the side view; and
   j) repeating steps (e) to (i) for all blocks of the side view associated with the base view processed in steps (a) to (b);
      wherein the context of the entropy encoder is its configuration obtained by means of analysis of preceding and current image data during an encoding process; and
      wherein to determine a block corresponding to a given block X, the following steps are performed:
         enumerating, for the currently encoded block, all its neighboring blocks Yi;
         checking, for each of the neighboring blocks Yi, whether the block Yi belongs to the disoccluded region;
         in case the block Yi does not belong to the disoccluded region, finding a block Yi', in the base view, corresponding to the block Yi;
         copying the state of the encoder and the estimated probabilities in the context models, the coding modes and syntax elements from the block Yi' to the block Yi; and
         selecting the block Yi being the left side neighbor of the block X.

2. The method according to claim 1, wherein the block is the smallest coding unit.

3. The method according to claim 1, wherein the block is a group of points encoded together, with a use of one selected mode, data of which are entropy coded.

4. The method according to claim 1, wherein the context includes coding modes, that are decision points outputs, selected during encoding process, at which the encoder may select one of possible modes.

5. A system for disoccluded region coding in multiview video data stream by an entropy encoder, the system comprising:
- a data bus communicatively coupling components of the system;
- a memory for storing data;
- an encoder for encoding the multiview video data stream;
- a context storage module configured to store context, of the entropy encoder, with a reference identifying the block of the base view;
- a block correspondence database configured to store a correspondence between an identified disoccluded block of a side view and a block of a base view;
- a controller configured to perform the following steps:
  a) entropy encoding a block of a base view;
  b) storing a state and estimated probabilities in contexts models of the entropy encoder in a context storage module with a reference identifying the block of the base view;
  c) repeating the aforementioned steps of encoding and storing for every block of the base view of the multiview video data stream;
  d) starting encoding of a detected disoccluded region and dividing, into blocks, disoccluded region of a side view associated with the base view;
  e) determining, for neighboring blocks, of a currently encoded block of the disoccluded region, that are not in the disoccluded region, a corresponding block in the base view, using a block correspondence database;
  f) when such a correspondence is determined, reading a previously stored state and estimated probabilities in context models of the entropy encoder for the corresponding block;
  g) copying all coding modes from the corresponding block in the base view, to the neighboring block according to said correspondence;
  h) applying, to the entropy encoder, the state, including said coding modes, and the estimated probabilities in the context models of the block, including the disoccluded region, that is on the left of the currently encoded block;
  i) encoding, by the entropy encoder, the currently encoded block of the side view; and
  j) repeating steps (e) to (i) for all blocks of the side view associated with the base view processed in steps (a) to (b);
- wherein the context of the entropy encoder is its configuration obtained by means of analysis of preceding and current image data during an encoding process;
- wherein to determine a block corresponding to a given block X, the controller is further configured to perform the following steps:
  enumerating, for the currently encoded block, all its neighboring blocks Yi;
  checking, for each of the neighboring blocks Yi, whether the block Yi belongs to the disoccluded region;
  in case the block Yi does not belong to the disoccluded region, finding a block Yi', in the base view, corresponding to the block Yi;
  copying the state of the encoder and the estimated probabilities in the context models, the coding modes and syntax elements from the block Yi' to the block Yi; and
  selecting the block Yi being the left side neighbor of the block X.

* * * * *